INVENTOR
VICTOR H. GRINICH
BY
Lippincott & Ralls
ATTORNEYS

May 8, 1962 V. H. GRINICH 3,034,106

MEMORY CIRCUIT

Filed Sept. 25, 1959 3 Sheets-Sheet 2

INVENTOR
VICTOR H. GRINICH

BY Lippincott & Ralls
ATTORNEYS

INVENTOR
VICTOR H. GRINICH
BY
Lippincott & Ralls
ATTORNEYS

United States Patent Office 3,034,106 Patented May 8, 1962

3,034,106

MEMORY CIRCUIT

Victor H. Grinich, Palo Alto, Calif., assignor, by mesne assignments, to Fairchild Camera and Instrument Corporation, Syosset, N.Y., a corporation of Delaware Filed Sept. 25, 1959, Ser. No. 842,243
8 Claims. (Cl. 340—173)

This invention relates to switching and memory circuits and more particularly to multijunction semiconductor devices used as binary memory units.

Numerous and varied uses and applications for memory circuits are too well known to require extensive discussion here, though the more obvious ones are for information storage, counting, and frequency division. The purpose of this invention is to provide new memory circuits having a combination of desirable features: compactness, reliability, long life, economy, versatility, and low power consumption.

Illustrative of the types of multijunction semiconductor devices which may be employed in memory circuits in accordance with the present invention is the p-n-p-n switching transistor. The characteristics of the p-n-p-n switching transistor or four-layer semiconductor diode is well known. It has three geometrically parallel p-n junctions—a collector junction intermediate two emitter junctions—which are electrically in series. The diode is operated with an applied voltage having a polarity that causes current to flow in the forward or low-resistance direction across the two emitter junctions and in the reverse or high-resistance direction across the collector junction. Normally, the overall device has the characteristic that its resistance is high (conductivity low) until the applied voltage reaches a certain critical voltage known as the breakover voltage, which has different values for different transistor types and can be varied over a considerable range by design. Once the breakover voltage is reached, the device "fires" or switches to a low resistance, high conductivity state, and thereafter a relatively large current can be sustained at a much lower voltage known as the sustaining voltage. Other multilayer semiconductor devices, specifically three-layer n-p-n or p-n-p switching transistors, have switching characteristics which permit them to be employed in certain embodiments of the invention. The four-layer diode has some advantage in its higher ratio of breakover voltage to sustaining voltage, and exceptionally low resistance (hence, low power loss) in the conductive state. On the other hand, three-layer transistors ideally have somewhat shorter switching time, and hence may be preferred for ultrahigh speed operation. In either case, the essential requirements are that the semiconductor device have at least one emitter junction in series with a collector junction, and a negative resistance characteristic over an operating range extending from the peak or breakover voltage to the lower sustaining voltage.

It has been found that such switching transistors can, under certain conditions, be "fired" by a voltage below the nominal breakover voltage, provided this voltage is applied as a pulse having a sufficiently short rise time. In the high resistance state, the reverse biased collector junction acts as a capacitor, which may be in either a charged or a discharged condition prior to application of a particular voltage pulse, depending upon previous independent events. If this capacitor is initially discharged, then the application of a pulse across the device will charge the capacitor, and, naturally enough, the charging current will flow across the emitter junction or junctions of the device. The peak instantaneous amplitude of the charging current is directly proportional to the amplitude of the applied pulse and the capacitance of the collector junction, and inversely proportional to the rise time of the applied pulse. Hence, small amplitude voltage pulses can cause the flow of relatively large instantaneous currents across the emitter junctions, and the diode will switch to its low resistance state if the voltage pulse is applied sufficiently suddenly, i.e., has a short enough rise time. On the other hand, if the collector junction capacitance is already in a charged condition, the charge being trapped and retained by the rectifying action at the emitter junction or junctions, application of the same voltage pulse will cause little current flow across the emitter junctions and the diode will not fire.

In this invention, the storage of charge at the collector junction capacitance is used as a memory mechanism. This capacitance can be charged, for example, by a gradually applied voltage smaller than the breakover voltage—a slow rising, lower amplitude pulse—which does not fire the diode, herein delineated as a charging or recycling pulse. Upon termination of the applied pulse, the accumulated charge is trapped by the rectifying action of the emitter junction or junctions—all of the junctions having become reverse-biased. The capacitance can discharge only through the high resistances of the reverse-biased junctions which may have an RC time constant as long as one tenth second or more. Moreover, repetitive, fast rising voltage pulses of the same low amplitude may now be applied—at a rate of one thousand per second, for example—without causing the diode to fire, because each applied pulse produces only enough current flow to replace the small amount of charge that leaks off of the charged collector junction capacitance between pulses. Thus, the charged condition can be maintained indefinitely by the repetitive application of suitable low amplitude, fast rise rate pulses which are hereafter delineated as interrogate or interrogation pulses.

The collector junction capacitance can be discharged at will by firing the diode—i.e., by applying a voltage pulse in excess of the breakover voltage—whereupon all junctions become forward biased and highly conductive. These pulses are hereafter identified as restore pulses for obvious reasons. Once the capacitance is discharged, each successive one of the interrogate pulses referred to above will fire the device because of the relatively large, instantaneous, charging currents that flow across the emitter junctions. Hence, the same periodic, interrogate pulses serve to keep the device indefinitely in either of two states: one in which the collector junction capacitance has been charged, as by a charging pulse, and the interrogation pulses produce little current flow through the diode but maintain a capacitance charge across the depletion layer of the collector junction; another in which the collector junction has been discharged, as by a restore pulse, whereby the interrogation pulse produces a substantial current flow through the diode and maintains the collector junction capacitance in a discharged condition. Further, a resistor or other load in series with the diode will provide a continuous train of output pulses—one for each interrogation pulse—whenever the device is in the second state, but not in the first, thereby providing a nondestructive readout responsive to the interrogation pulses.

Switching from one state to another is readily accomplished by a variety of alternatives; application of pulses having different amplitudes and rise times to the semiconductor device as a diode; application of suitable signals to additional terminals which may be provided on the semiconductor device for control purposes; and varying the load impedances in series with the semiconductor device to shift the operating point on the voltage-current characteristic.

From the foregoing general description of the present invention, it can be appreciated that the objects and features relate to the utilization of multilayer, semiconductor devices in a variety of configurations, all for the purpose of providing a binary memory device with a nondestructive readout.

The various objects and features of the present invention may be more fully understood when the following detailed description is read with reference to the drawings in which.

Figure 3:
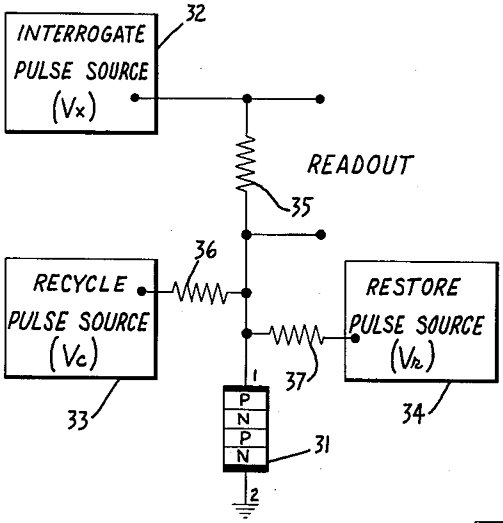
FIG. 3 is a first exemplary embodiment of the binary memory circuit forming the present invention.
Figure 6:
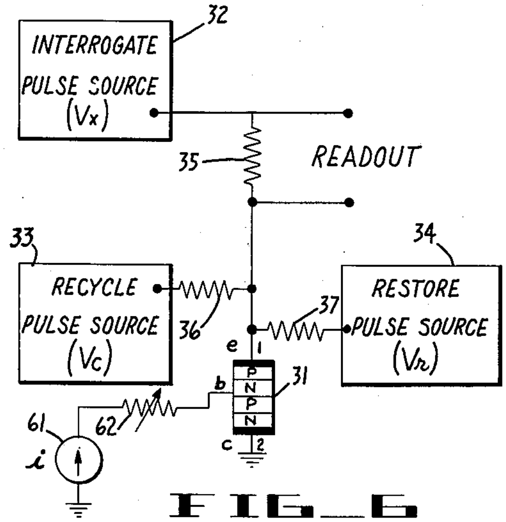
Figure 7:
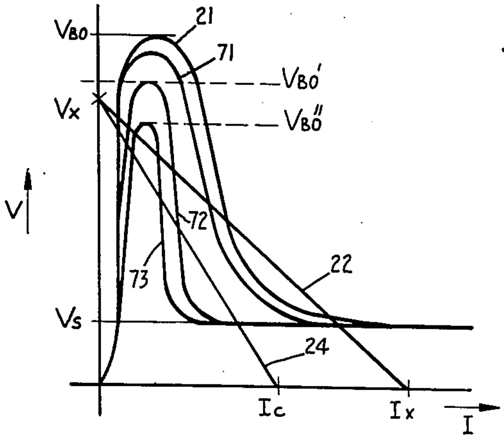
Figure 5:
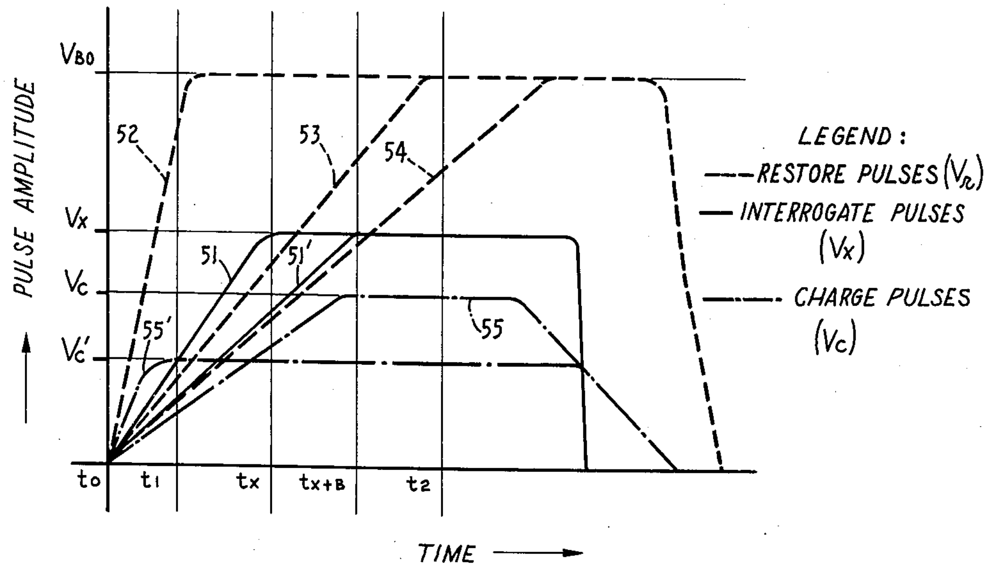
Figure 8:
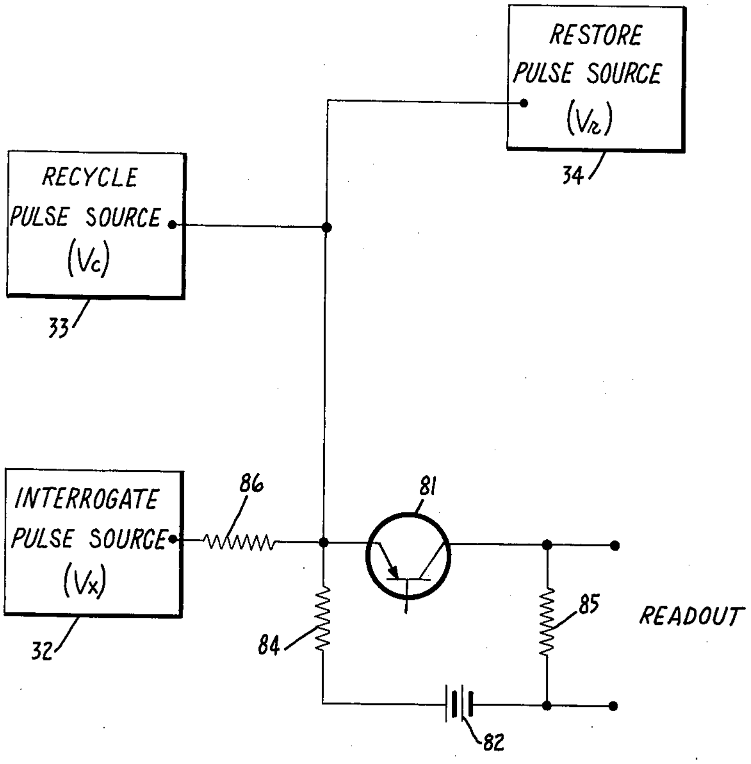
Figure 9:
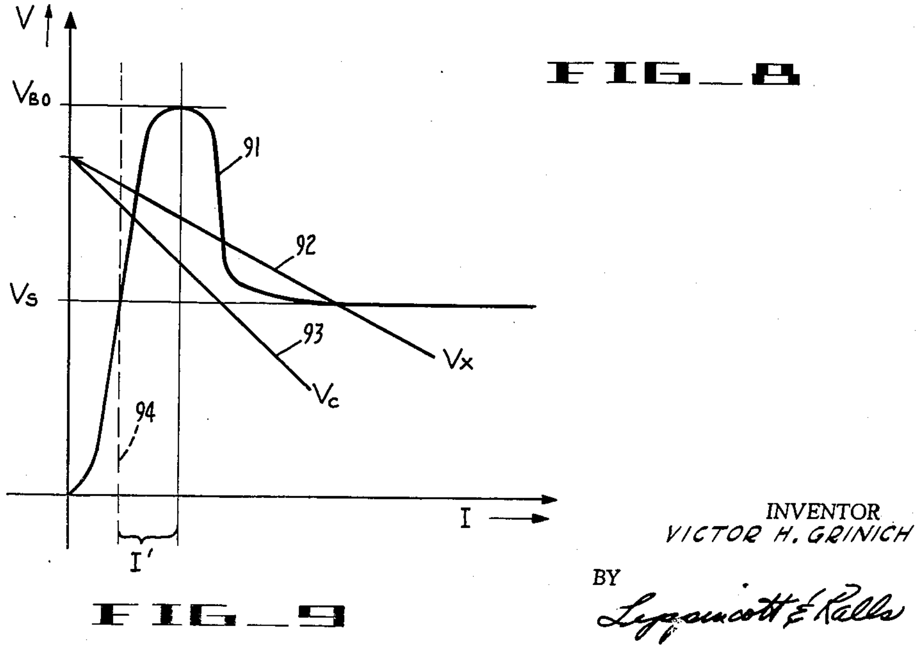

FIG. 5 diagrammatically relates the pulse amplitudes to the rise times of the pulses generated by the sources illustrated in FIG. 3;

FIG. 6 is a second exemplary embodiment of the present invention utilizing control means in the base circuit of the diode;

FIG. 7 is a family of voltage-current characteristic curves for different base biases of the circuit of FIG. 6;

FIG. 8 is a third exemplary embodiment of the present invention utilizing a p-n-p transistor as a two terminal device; and FIG. 9 is a typical voltage-current characteristic for the transistor of FIG. 8.

Figure 1:
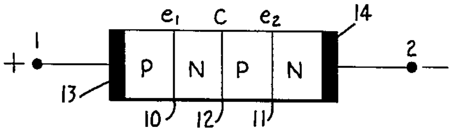
FIG. 1 is a schematic of a p-n-p-n switching diode.
Figure 2:
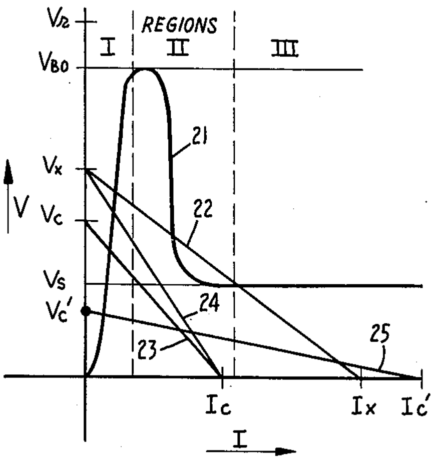
FIG. 2 is a typical voltage-current characteristic of the p-n-p-n diode of FIG. 1.

Considering FIGS. 1 and 2 first, a p-n-p-n or four-layer diode can be related to its negative resistance characteristic. FIG. 1 illustrates a p-n-p-n diode including alternate layers of p and n type material with emitter junctions 10 and 11 and interposed collector junction 12. Formed on the outer layers of p and n type material, respectively, are ohmic contacts 13 and 14 which are connected to terminals 1 and 2. As an increasing positive potential is applied to terminal 1 with respect to terminal 2, the current-voltage relation follows a path approximated by the V—I curve 21 of FIG. 2. In the range marked Region I, substantial increases in the voltage applied across the four-layer diode cause little change in the current flowing therethrough. As soon as voltage applied across the diode reaches the breakover voltage $V_{bo}$, the diode fires and the V—I characteristic curve becomes negative. That is to say, at the breakover voltage the intermediate, negative resistance Region II is entered. In this range, at first the current increases without any change in the breakover voltage, and thereafter the voltage drops sharply to a lower sustaining value ($V_s$) and the current continues to increase. As the voltage approaches a sustaining voltage, the diode enters its low resistance stable Region III. If the voltage applied is in the form of a pulse, the diode will shift from its low conductivity (Region I) to its high conductivity (Region III) state, and will remain there until the pulse is interrupted—at which time it switches back to its low conductivity state.

The first exemplary embodiment of the present invention, schematically represented in FIG. 3, is designed, as noted earlier, to take advantage of the negative resistance characteristic of four-layer diodes, the capacitance of the collector junction and the high amplitude current which immediately flows through the emitter junctions when the collector junction is uncharged. The memory circuit of FIG. 3 includes a four-layer diode 31, a source of interrogate pulses 32, a source of recycle or charging pulses 33, a source of restore pulses 34, and a readout resistor 35 connected between the interrogate pulse source 32 and the terminal 1 of the diode 31. The recycle pulse source 33 is connected to terminal 1 through a resistor 36 and the restore pulse source 34 is connected to terminal 1 through a resistor 37. The memory and readout circuit of FIG. 3 is operated as follows:

Assuming for the moment that the interrogate pulse $V_x$ has an amplitude less than $V_{bo}$ and greater than $V_s$ but a rise time sufficiently fast, each time an interrogate pulse $V_x$ from source 32 is applied across the diode 31, the diode will "fire," provided the collector junction is discharged. Whenever the diode 31 fires, the substantial increase in current flowing through resistor 35 provides a nondestructive readout as indicated. On the other hand, if the application of an interrogate pulse $V_x$ finds the collector junction of diode 31 charged, the instantaneous current flowing through resistor 35 and the diode 31 will not be sufficient to force the diode over the breakover voltage hump and into the negative resistance region. The readout across resistor 35 will be substantially zero since the interrogate pulse $V_x$ will have only recharged the collector junction of diode 31 to the extent that the charge had leaked off. Thus, each time the interrogate pulse $V_x$ generated by source 32 is applied across the diode 31, the presence or absence of a stored bit (at the collector junction of diode 31) will be ascertained by the presence or absence of a readout voltage across resistor 35. Further, the application of the interrogate pulse $V_x$ will leave the collector junction of the diode 31 in whichever of its charged or uncharged states that it found it.

In addition to the source 32 of interrogate pulses $V_x$, a source 33 of recycle or charging pulses $V_c$ is connected across diode 31. By care in selecting the amplitude and rise time of the pulses $V_c$, it is possible to charge the collector junction of diode 31 without ever causing it to fire. In order to discharge the collector junction in response to other external control functions, a source 34 of restore pulses $V_r$ may be applied across diode 31 by way of resistor 37. The $V_r$ pulses exceed the breakover voltage of the p-n-p-n diode 31. With these three sources of pulses, the repetitive application of interrogate pulses $V_x$ will provide a readout if the collector junction of diode 31 is discharged and no readout if the collector junction is charged. Selective application of chargnig pulses $V_c$ may charge the collector junction, and selective application of restore pulse $V_r$ can discharge the junction.

Figure 4:
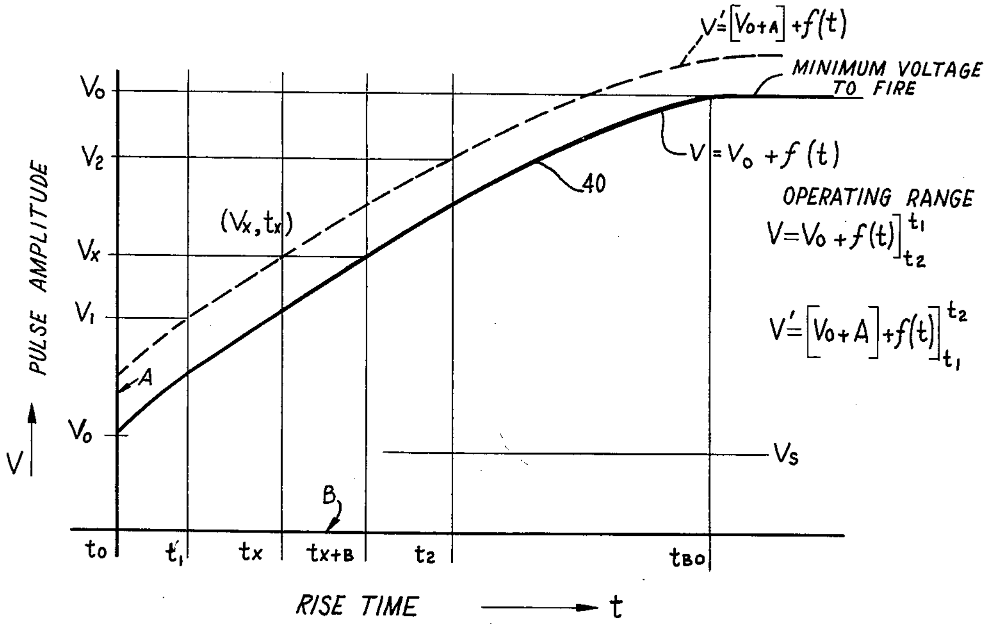
FIG. 4 is a diagram of pulse amplitude v. pulse rise time illustrating the voltages required to fire the diode of FIG. 1.

Looking more particularly now to the pulse amplitudes and rise times which will provide the types of controls described, consider FIGS. 4 and 5. FIG. 4 illustrates a "minimum voltage to fire" curve 40 for diode 31. It is apparent, of course, that such curves for specific p-n-p-n diodes or other multilayer semiconductors will vary from the exemplary one. Even so, the curve of FIG. 4 is typical of the shape such curves would assume. By projection, for a pulse of substantially zero rise time ($t_0$), a voltage approximating $V_0$ must be supplied, whereas if the amplitude is to be equal to or greater than $V_{bo}$, the rise time can be as long at $t_{bo}$. Between the pulses having amplitudes of $V_0$ and rise times of $t_0$, and those having ampitudes greater than $V_{bo}$ and rise times greater than $t_{bo}$, are various combinations of amplitudes and rise times sufficient to fire a diode comparable to diode 31. As long as the relation of rise times and amplitudes are selected to keep the (V, $t$) coordinates to the left and above the minimum voltage curve 40, the interrogate pulses selected will properly perform their function. Naturally enough, it would be dangerous to select a pulse amplitude and rise time falling on the minimum voltage curve 40, since any slight variations in the diode characteristics might cause a failure of the circuit. If the amplitude-rise times of the interrogate pulses are chosen somewhere between amplitudes $V_1$ and $V_2$ and rise times $t_1$ and $t_2$, the circuit will operate satisfactorily and, at the same time, a sufficient margin of safety will be provided to accommodate variations in diode parameters.

If the minimum voltage curce 40 is expressed as $$V=V_0+f(t)$$

the voltage curve going through the coordinate points ($V_1$, $t_1$) and ($V_2$, $t_2$) may be expressed as $$V'=(V_0+A)+f(t)$$

where A is the displacement along the ordinate axis from the minimum voltage curve 40. Exemplary operating points might be selected with the interrogate pulse falling in the range of $$\left[V_0+A\right]_{V_1}^{V_2}+\left[f(t)\right]_{t_1}^{t_2}$$

as noted.

Assume that the interrogate pulse amplitude and rise time are selected at ($V_x$, $t_x$), it is apparent that the application of this pulse (generated by source 32) will operate diode 31 when the collector junction is discharged and not operate it when the collector junction is charged. The selected interrogate pulse $V_x$ of FIG. 4 is shown as an expanded pulse in FIG. 5. The latter, a diagram of pulse amplitudes v. time, illustrates the wave fronts of the interrogate, storage and restore pulses. Pulse 51, representing the selected interrogate pulse $V_x$ starts at about $t_0$ and reaches amplitude $V_x$ at time $t_x$. As long as the leading edge of $V_x$ is at least as steep as that of pulse 51' $(t_x+b)$, it will fire the diode 31 if the collector junction is discharged (assuming the amplitude is unchanged). The abscissa distance B is the margin of safety built into the selection of interrogate pulse 51.

Restore pulses $V_r$ generated by source 34 and applied at times across the diode 31 are also illustrated in the diagram of FIG. 5. For example, the pulse wave front might appear as any one of illustrative pulses 52, 53, or 54. Within the switching time limits of the memory circuit, irrespective of how fast the rise time is, as long as the amplitude reaches $V_{bo}$, the diode will fire. While the rise time of the exemplary $V_r$ pulse traced by pulse 52 is faster than that of interrogate pulse 51, the rise times for the $V_r$ pulses illustrated by pulses 53 and 54 are slower. In spite of the fact that a $V_x$ having a rise time as slow as $V_r$ pulses 53 and 54 would not fire the diode 31, the $V_r$ pulses themselves will do so because their amplitudes more than compensate for their insufficient rise times.

The recycle or charging pulses $V_c$, which are generated by source 33, are selected so that the combination of their amplitudes and rise times is not sufficient to fire diode 31 and sustain it, even though the collector junction is discharged. In the exemplary case illustrated in FIG. 5, $V_c$ (pulse 55) has an amplitude lower than $V_x$ and a rise time slower than $t_x$. No application of pulse 55 across diode 31 will do more than charge the collector junction.

The amplitudes of these exemplary pulses are shown on the V—I curve of FIG. 2 along with respective exemplary load lines. For example, the interrogate pulse $V_x$ may operate along a load line 22 which intersects the bend of curve 21 and crosses the current axis at $I_x$. Upon application of the interrogate pulse $V_x$ to the memory circuit of FIG. 3, the current—assuming the collector junction is discharged—is sufficient to push the operating point into the negative resistance region which causes the diode 31 to fire. Upon firing, the diode transfers to its high conductivity region and will be maintained in this region as long as the applied voltage exceeds the sustaining voltage $V_s$. As soon as interrogate pulse $V_x$ is interrupted, the operating point will pass back across the unstable region to its quiescent, low conductivity state. On the other hand, the charge or recycle pulse $V_c$ (pulse 55), might have a load line 23 which intersects the current axis at $I_c$. Since load line 23 never intersects the knee of V—I curve 21, it can never switch the diode 31 from Region I to Region III, although it will charge the collector junction. Finally, the restore pulse $V_r$, as is illustrated (FIG. 5), exceeds $V_{bo}$ by some amount.

Various other combinations of amplitude-rise times may be selected which will perform comparable switching and charging functions. For example, the charge pulse $V_c$ might be chosen with an amplitude equal to $V_x$ but with the same rate of rise as previously depicted by curve 55 in FIG. 5. In this case, the operating point would travel along load line 24 (FIG. 2). Thus, even though the amplitude of the pulse was the same as the interrogate pulse $V_x$ it would not shift the diode 31 to its high conductivity region nor maintain it there.

Another situation may be envisioned if the amplitude-rise time of $V_c$ is sufficient to momentarily fire the diode 31 but not sufficient to maintain it in its low resistance state. This will occur when the amplitude of the $V_c$ pulse is less than the sustaining voltage $V_s$ but the pulse has an extremely rapid rise time. Such a pulse $V_c$ might look like pulse curve 55' of FIG. 5. For this pulse characteristic, load line 25 (FIG. 2) might be followed. It can be seen that the load line 25 does not intersect the knee of curve 21 and hence the fired diode 31 cannot be maintained in its low resistance state after it is momentarily fired. This means, of course, that the sustaining voltage $V_x$ lies somewhere between the amplitudes of pulses 55 and 55'. In all of these manipulations of pulse amplitudes and rise times it is desirable that the trailing edges of the restore and interrogate pulses fall off rapidly after the current is interrupted; otherwise, the diode 31 may be maintained in its high conductivity state too long. It is immaterial, within the limits of the circuit readout capacity how slowly the charging pulses decay.

In furtherance of this manipulation of load lines, the charge pulse source 33 could be eliminated and resistor 35 varied to manipulate the relationship between the rise times and amplitudes of pulses $V_x$ and $V_c$. The restore pulse $V_r$, which is supplied in the exemplary embodiment of FIG. 3 by source 34, could be supplied also by way of a variable resistor 35. The restore pulse $V_r$ since it exceeds the amplitude of $V_{bo}$ will fire diode 31 any time that it is applied across the diode and variations of resistor 35 could provide this necessary amplitude.

A further modification of the memory readout circuit illustrated in FIG. 3 can be effected by employing the four-layer diode 31 as a three or more terminal device, i.e., as a transistor. FIG. 6 represents this type of modification of the circuit of FIG. 3. A source of current 61 is applied through the transistor base terminal to further vary the relative amplitudes and load lines of the overall circuit. The components in the circuit of FIG. 6 are given the same numbers as in FIG. 3 wherever possible in order to point up the close relationship. Beyond the connection of sources of interrogate, storage and restore pulses ($V_x$, $V_c$ and $V_r$) across the device 31, the source of current 61 is connected through a variable resistor 62 to the interior layer of n-type material. This makes the p-n-p-n diode 31 act more or less as a conventional transistor having an emitter (terminal 1), collector (terminal 2) and base. By varying the current from source 61 which is applied to the base of the device 31, the shapes and sizes of the V—I curves associated therewith may be varied. FIG. 7 illustrates a family of these curves as they may be formed by biasing device 31 through preselected amounts of current from source 61, as selected by changing variable resistor 62.

The largest V—I curve in magnitude is curve 21 previously considered in FIG. 2. On the other hand, curves 71, 72, and 73 are formed by placing successive and different controlled currents on the base connection of device 31. In connection with the family of V—I curves of FIG. 7, the load lines of 22 and 24 are redrawn for illustrative purposes. By observing where these two load lines intersect various ones of the V—I curves 21, 71, 72 and 73, it can be appreciated that if the bias current applied to the base terminal of device 31 is too large, the V—I curve might resemble 72 or 73, and the load line 24, corresponding to charge pulse $V_c$, will intersect the knees of curves 72 and 73, thereby causing the device 31 to shift from its low conductivity to its high conductivity state. This being true, it is possible to provide an interrogate pulse identical to the charge pulse in amplitude and rise time, and still obtain the selective control necessary by varying the current flowing in the base circuit of the device 31. Yet another problem arises. Note, in connection with the family of V—I curves, that the breakover voltage $V_{bo}$ decreases in absolute amplitude for each of the curves 21, 71, 72 and 73, the latter one being identified as $V''_{bo}$. Thus, while the interrogate pulse $V_x$ will not fire device 31 when the V—I characteristic approximates curve 21, if the collector junction is charged, in changing the V—I curve to that depicted by 73 for example, it causes the $V_x$ pulse to become larger than the new breakover voltage $V''_{bo}$. Therefore, the interrogate pulse $V_x$ will fire the device 31, irrespective of the charged or uncharged condition of the collector junction.

It can be seen from the foregoing that by proper choice of biasing and judicious selection of other circuit components, it is possible to employ a single pulse to perform the interrogate, charge and restore functions without anything more.

The concepts embodied in the present invention, as noted earlier, are not limited to p-n-p-n diodes, whether they are employed as two-, three-, or four-terminal devices. They can also be used with profit with more conventional p-n-p and n-p-n transistors connected as two-element devices. An example of the latter is illustrated in FIG. 8. Here again, like components are given like numbers insofar as possible. This embodiment of the memory circuit finds p-n-p transistor 81 cooperating with interrogate pulse source 32, charge pulse source 33, and restore pulse source 34. The transistor 81 is connected with the base floating and includes emitter bias resistor 84 and load resistor 85, the latter of which may act as a nondestructive readout for the memory circuit. A bias source 82 is connected in the emitter-collector circuit.

By applying an interrogate $V_x$ from source 32, by way of resistor 86, transistor 81 "fires" and an output pulse is generated across load resistor 85 if the collector junction of transistor 81 had been previously uncharged. If the junction was previously charged, the interrogate pulse $V_x$ will not fire the transistor 81. All of this is quite similar to the functioning of diode 31, as previously described. By applying a pulse $V_c$ from source 33, it is possible to charge the collector junction, but the pulse is not of sufficient amplitude or rise time to increase the emitter current to the point where it fires the transistor 81. And finally, the application of pulse $V_r$ from source 34 will fire transistor 81, irrespective of the instant condition of the collector junction.

The V—I characteristic curve and load lines for the circuit of FIG. 8 are illustrated in FIG. 9. A typical negative resistance characteristic curve 91 has the usual two stable regions separated by a negative resistance region, but with a higher sustaining voltage. With the load line 92 associated with $V_x$ and the load line 93 associated with $V_c$ as shown, it can be seen that the application of an interrogate pulse $V_x$ will shift transistor 81 through the negative resistance region to its highly conductive state, whereas application of pulse $V_c$ will charge the junction but will not fire the transistor. By varying the emitter bias resistor 84, the bias line 94 can be shifted from the V-axis towards the breakover point of the characteristic curve 91. With the bias line 94 as illustrated, if an emitter current greater than I' is supplied to transistor 81, the transistor will fire and an output pulse will be detected across resistor 85. Contrariwise, if the instantaneous maximum amplitude current flows in the emitter circuit when a pulse $V_c$ is applied, and it does not exceed I', the collector junction is charged but the transistor will not fire. Other manipulations of this particular embodiment will be evident from the preceding consideration of the earlier embodiments.

The utilization of multijunction semiconductor devices as binary memory units has been illustrated in a variety of circuits. It should now be apparent that the concepts which are involved in employing these multijunction devices in memory circuits are not limited to any one type of device or circuit. The devices and their cooperating circuitry can be incorporated in any one of a number of configurations tailored to provide more or less optimum results. The types of devices are limited only by the junction capacitance phenomenon, the negative resistance characteristic and their current responsiveness.

While the present invention has been illustrated principally in connection with p-n-p-n diodes and p-n-p transistors, the inventive concept is also applicable to many other types of semiconductor devices. The present memory circuits are particularly attractive for use in diode matrices of one sort or another, but other devices and circuits may be envisioned by those skilled in the art without departing from the spirit and scope of the present invention. As a consequence, the invention should in no way be limited except to the extent of the claims.

What is claimed is:

1. A memory device comprising a semiconductor with a collector junction and having a negative impedance characteristic when a reverse bias is applied to said junction under a first condition or a separate second condition, said first condition existing when said bias exceeds a critical breakover voltage, said second condition existing when said bias is less than said breakover voltage but is built up faster than a critical breakdown rate at a time when said collector junction is essentially uncharged as a capacitor, charging means placing a capacitance charge across said junction, restoring means discharging any capacitance across said junction, interrogating means intermittently applying to said junction a reverse bias pulse having an amplitude less than said breakover voltage and at a build-up rate greater than said breakdown rate, thereby triggering a low impedance pulse through said semiconductor if said junction has a capacitance charge and inducing a high impedance pulse if said junction has substantially no capacitance charge, and readout means measuring the current induced by each interrogating pulse and indicating whether said pulse induces a low impedance or a high impedance current flow in said semiconductor.

2. The device as described in claim 1 wherein said charging means comprises means applying across said junction a reverse bias having an amplitude less than said breakover voltage and applied at a rate less than said breakdown rate, thereby placing a charge across the depletion layer of said junction but maintaining said semiconductor in the high impedance state.

3. The device as described in claim 1 wherein said restoring means comprises means applying across said junction a reverse bias pulse having an amplitude greater than said breakover voltage, thereby triggering a low impedance current flow in said semiconductor and discharging any accumulated charges at the depletion layer of said junction.

4. The device described in claim 3 wherein said charging means comprises means applying across said junction a reverse bias having an amplitude less than said breakover voltage and applied at a rate less than said breakdown rate, thereby placing a charge across the depletion layer of said junction.

5. A memory device comprising a semiconductor having at least one emitter junction and a collector junction, said semiconductor having a negative impedance characteristic upon application of a voltage across said junctions to reverse bias said collector junction under a first condition or a separate second condition, said first condition existing when said voltage exceeds a critical breakover voltage, said second condition existing when said voltage has an amplitude less than said breakover voltage but is built up faster than a critical breakdown rate at a time when said collector junction is essentially uncharged as a capacitor, charging means applying across said junctions a voltage pulse to reverse bias said collector junction and having an amplitude less than said breakover voltage and applied at a rate less than said breakdown rate whereby a capacitance charge is placed at said collector junction, restoring means applying across said junction a voltage pulse having an amplitude establishing said first condition thereby triggering a low impedance current pulse through said junction and discharging any capacitance therein, interrogating means applying periodic voltage pulses across said junctions to reverse bias said collector junction and having an amplitude less than said breakover voltage and applied at a buildup rate greater than said breakdown rate, thereby triggering a low impedance pulse in said semiconductor if said collector junction is uncharged as a capacitor and inducing a high impedance pulse if said collector junction is charged as a capacitor, and a readout means associated with said innterrogatory means indicating whether each said interrogating pulse induces a low impedance or a high impedance current flow in said semiconductor thereby indicating whether said collector junction is in a charged condition or a discharged condition.

6. A device as described in claim 5 wherein said interrogating pulses are applied at intervals such that the off time is substantially less than the resistance-capacitance time constant of said semiconductor.

7. A memory device comprising a semiconductor having a collector junction between two emitter junctions, two electrical connections attached to said semiconductor and separated by the three said junctions, said semiconductor having a negative impedance characteristic upon applying a voltage across said junctions in the direction of reverse biasing said collector junction under a first condition or a separate second condition, said first condition existing when said voltage is greater than a critical breakover voltage, said second condition existing when said collector junction is essentially uncharged as a capacitor and said voltage has an amplitude less than said breakover voltage but is built up faster than a critical breakdown rate, charging means applying across said connections a voltage pulse having an amplitude less than said breakover voltage and at a build-up rate less than said breakdown rate to place said collector junction in a charged condition as a capacitor, restoring means applying across said connections a voltage pulse greater than said discharge voltage thereby triggering said semiconductor to a low impedance state and discharging any capacitance at said collector junction, an interrogating means applying across said connections a train of voltage pulses having amplitudes less than said breakdown voltage and applied at a build-up rate faster than said breakdown rate, thereby triggering said collector junction to a low impedance state and inducing a low impedance current pulse through said connections if said collector junction is in an uncharged condition as a capacitor and inducing high impedance current pulse if said collector junction is in a charged condition, the off time between successive interrogating pulses being substantially less than the resistance-capacitance time constant of said semiconductor, and a readout means sensing the amplitude of current induced by said interrogating pulses to indicate whether said collector junction is in a charged or an uncharged condition.

8. A memory device comprising a semiconductor having four successive zones of alternating conductivity types arranged to have two end zones and two contiguous zones intermediate thereto with an emitter junction between each of the two end zones and the adjoining intermediate zone and a collector junction between the two intermediate zones, an electrical connection to each of the two end zones, said semiconductor assuming a low impedance state when a voltage is applied across the end zones to reverse bias said collector junction under a first condition or a separate second condition, said first condition existing when said voltage has an amplitude exceeding a critical breakover voltage, said second condition existing when said voltage has an amplitude less than said breakover voltage and is built up faster than a critical breakdown rate at a time when said collector junction is essentially uncharged as a capacitor, a charging means applying across said connections a voltage pulse reverse biasing said collector junction and having an amplitude less than said breakover voltage and built up at a rate less than said breakdown rate to charge said collector junction as a capacitor, a restoring means applying across said connections a voltage pulse establishing said first condition thereby triggering a low impedance current pulse through said junctions and discharging any capacitance across said collector junction, interrogating means applying across said connections a pulse train of voltages reverse biasing said collector junction, each said pulse having an amplitude less than said breakover voltage with a build-up rate faster than said breakdown rate and a time off period between successive pulses substantially less than the resistance-capacitance time constant of said semiconductor between said connections, thereby triggering said semiconductor into a low impedance state if said collector junction is uncharged as a capacitor and inducing a high current pulse through said connections or inducing a low current pulse if said collector junction is charged as a capacitor and said semiconductor remains in a high impedance state, and a readout means connecting to said interrogating means indicating the amplitude of current induced by each said interrogating voltage pulse, thereby indicating if said pulse induces a low impedance or a high impedance current flow through said semiconductor.

References Cited in the file of this patent

UNITED STATES PATENTS

| | | |
|---|---|---|
| 2,877,359 | Ross | Mar. 10, 1959 |
| 2,907,000 | Lawrence | Sept. 29, 1959 |
| 2,912,598 | Shockley | Nov. 10, 1959 |